United States Patent [19]

Schettino

[11] Patent Number: 5,417,006
[45] Date of Patent: May 23, 1995

[54] MAGNETIC INFLUENCE AND CONTROL OF LIVING ORGANISMS

[76] Inventor: Renato F. Schettino, 752 Thayer Ave., Los Angeles, Calif. 90024

[21] Appl. No.: 144,007

[22] Filed: Nov. 1, 1993

[51] Int. Cl.⁶ .............................................. A01K 79/02
[52] U.S. Cl. ..................................................... 43/17.1
[58] Field of Search .................... 43/17.1, 9.1, 9.2, 9.6, 43/98; 119/106, 107, 108

[56] References Cited

U.S. PATENT DOCUMENTS

| | | | |
|---|---|---|---|
| 2,745,205 | 5/1956 | Kafka | 43/17.1 |
| 2,778,140 | 1/1957 | Applegate et al. | 119/220 |
| 2,789,383 | 4/1957 | Solter | 43/17.1 |
| 2,832,168 | 4/1958 | Brown | 43/17.1 |
| 3,005,280 | 10/1961 | Vang | 43/17.1 |
| 3,069,797 | 12/1962 | Kreutzer | 43/17.1 |
| 3,668,801 | 6/1972 | Metcalf, Jr. | 43/17.1 |
| 3,693,276 | 9/1972 | Kurc | 43/17.1 |
| 3,822,403 | 7/1974 | Coleman et al. | 119/220 |

FOREIGN PATENT DOCUMENTS

83/03849  11/1983  WIPO .................. 43/17.1

*Primary Examiner*—P. Austin Bradley
*Assistant Examiner*—Chuck Y. Mah
*Attorney, Agent, or Firm*—James E. Brunton

[57] ABSTRACT

A method and apparatus for influencing living organisms by artificially induced magnetic fields. Of particular interest is the commercial harvesting of fish wherein the apparatus of the invention is used to controllably influence defined volumes of water in a manner to control the fish disposed therewithin by drastically upsetting or altering the orientation or "compass sense" of the fish. Of special interest is the commercial application of the method and apparatus to separate tuna and dolphins prior to setting the net around those dolphin schools beneath which tuna schools migrate in association. In this manner, the incidental mortality of dolphins will be reduced to zero.

11 Claims, 2 Drawing Sheets

MAGNETIC INFLUENCE AND CONTROL OF LIVING ORGANISMS

BACKGROUND OF THE INVENTION

1. Field of the Invention

The present invention relates generally to methods and apparatus for influencing living organisms by artificial magnetic fields. More particularly, the invention concerns a method and apparatus for controlling and harvesting fish using artificially induced magnetic fields. Specifically, the invention concerns method and apparatus for separating those tuna and dolphins which migrate in association.

2. Discussion of the Invention

For centuries the commercial harvesting of fish such as tuna, salmon, shrimp, bottom and mid-water fish and the like, has been accomplished using large nets. This type of fishing, as now practiced, is cumbersome, generally inefficient and often damaging to the ecology. Due to these facts, and because the public has become increasingly concerned with protecting the environment, the techniques used by commercial fishermen in trawl and seine net fishing has come under close scrutiny. Of particular concern is the needless killing of dolphin during commercial tuna fishing. When fishing for dolphin-associated tuna, the entire school of dolphins is typically encircled by a very large seine net. In such cases, the net not only captures the tuna which swim beneath the dolphins, but also frequently captures the dolphins which, being mammals, swim in the top surface layers of the water. The result is the incidental death of large numbers of dolphin by drowning.

In an attempt to avoid the problems inherent in net fishing, considerable effort has been devoted to alternate methods for harvesting fish. In this vein, there has been considerable experimentation with the reaction of living organisms, and particularly fish, to external stimuli such as sound, bubble screens, olfaction, chemoreception, light and predator and prey vocalizations. This experimentation has clearly shown that these stimuli are not particularly effective in eliciting repeatable responses of fish. On the other hand, clear evidence exists that fish will, in fact, respond to an artificial electric field. For example, controlled experiments have shown that fish can be attracted to the anode of an electrode array formed by two or more electrodes arranged to establish an artificial electric field in either fresh or sea water. However, because sea water is highly conductive, very large power requirements are necessary to establish electric fields of any magnitude.

While fish, both individually and in groups, clearly respond to electric fields, the very large power requirements necessary, the complexity of equipment design and the inordinately high costs associated with this technique have largely prevented widespread commercial application of electrofishing at sea. By way of example, in salt water with average conductivity, a 100 kilowatt source will produce a meaningful electrical effect within a range of only about five meters for smaller fish and about ten meters for larger fish. An extension of the fishing range to about twenty meters would require a source of about 1.6 megawatts. These disadvantages are not eliminated by the use of pulsed currents. Working range diameters significantly larger than twenty meters cannot be economically achieved with present technology. This is principally due to the substantial nonuniformity of the artificial electric field in the open sea and also due to the fact that the strength of the electric field decreases as the inverse square of the distance between the source and the point of observation.

In light of the drawbacks inherent in electrofishing and in view of the fact that the intensity of an artificial magnetic field produced, for example, by a long terminally grounded, electrically energized, insulated wire source varies only as the inverse first power of the distance from the source to the point of observation, the present inventor has turned his focus away from electrofishing and toward the use of magnetic fields in fishing operations. In this regard, there exists ample evidence that magnetic material is present in many living organisms such as algae, honeybees, sea turtles and in certain birds and fish, including tuna, dolphin (which are mammals, but herein are referred to broadly as "fish") and salmon. This magnetic material, which is also present in humans, forms permanent magnetic centers that provide a "compass sense" which enables varying degrees of orientation within the natural geomagnetic field. Experience has shown that any living organism that possesses this "compass sense" can be controlled within definite ranges by an external, artificially-induced magnetic field of sufficient magnitude to overcome this "compass sense" or sensitivity of the organism to variations in the natural geomagnetic field.

SUMMARY OF THE INVENTION

The present invention relates to the use of artificial magnetic fields to control and harvest living organisms such as fish. Using the method and apparatus of the invention, fish can be successfully rounded up, concentrated into schools and moved to a desired location for harvesting in an appropriate manner. More particularly, fish and various other organisms living in water, can effectively be caused to move toward the surface, toward the bottom, or toward any predetermined location best suited for harvesting or other control regimen.

In accordance with the present invention, artificial magnetic fields are produced by electrically energizing sources of various configurations in a manner to appropriately influence and control magnetically specific organisms. More particularly, the method and apparatus of the invention has been shown to be especially useful in controlling living organisms such as fish living in fresh and sea water, including tuna, dolphin, salmon, shrimp, shark, marlin and various related species.

The magnetic fields which are artificially created by the apparatus of the present invention are configured to controllably influence defined volumes of water in a manner to influence and control all the organisms disposed therewithin by drastically upsetting or altering the orientation or "compass sense" of the organisms. The range of action and the effects of the magnetic influence produced by the apparatus depends on the sensitivity of the particular organism to variations in the natural geomagnetic field and on the configuration, direction intensity and polarity of the artificially created magnetic field.

A particularly important use of the present invention is found in the commercial harvesting of tuna. For the first time, the method of the present invention enables the breaking of the tuna-dolphin "bond" prior to the setting of the net. By generating appropriate magnetic fields, the tuna can be directed in one direction while the dolphin can be directed in another. For example, the tuna can be concentrated in the upper layer of the water volume and the dolphins dispersed in the outside areas, thereby separating the species and saving the dolphin from capture within the net and death by drowning.

With the aforementioned considerations in mind, it is an object of the present invention to provide a method and apparatus for efficiently and predictably controlling living organisms of the character possessing magnetic dipole moments and thus exhibiting sensitivity to variations in the natural geomagnetic field.

More particularly, it is an object of the invention to provide an apparatus for controllably generating magnetic fields in a defined volume of water in a manner so as to controllably influence living organisms, such as fish, that are disposed within the volume.

Another object of the invention is to provide a method and apparatus of the character described which is useful in controllably moving fish from one location in a defined volume of water to another location so that the fish can be more efficiently harvested.

Another object of the invention is to provide a method of the character described in the preceding paragraph which is useful in separating dolphins from tuna so that the tuna can be harvested without killing the dolphins.

Another object of the invention is to provide an apparatus for generating artificial magnetic fields within a defined volume of water that can be controllably moved through the water volume by mechanical means, helicopter or by being towed behind watercraft of conventional design.

Still another object of the invention is to provide an apparatus of the class described in the preceding paragraph which is capable of generating vectorially different artificial magnetic fields within selected portions of the defined volume of water.

Another object of the invention is to provide a method and apparatus for use in harvesting and controlling fish and other living organisms which is practical, easy to use and cost effective in operation.

Another object of the invention is to provide an apparatus of the class described in the preceding paragraphs which can be easily assembled in a different number of configurations and easily operated in a number of different modes to meet a large number of specific requirements or conditions.

DESCRIPTION OF PREFERRED FORMS OF THE INVENTION

Basically, the means for inducing an artificial magnetic field within a volume of water, comprises single cables, cable assemblies, consisting of more than one cable, and combinations thereof. All cables are terminally-grounded, insulated, either buoyant or non-buoyant conductors of various lengths, appropriate overall diameters and conducting cross-sections.

The apparatus of the invention can be assembled in eight basic configurations, two of which are simple, consisting of single cables (FIGS. 1 and 2), and six of which are composite, consisting of the combination of single cables and cable assemblies. (FIGS. 3, 5, 6 and 7).

Specific configurations of the apparatus are assembled for the specific type of fishing of interest and are towed either directly by appropriate means, (such as, watercraft, helicopter, mechanical means as winches), or indirectly through intermediate suitable floats. The conductors' cross-sections are determined by the rating and characteristics of the power supply, the mode of operation, (continuous or pulsed), and the intensity of the magnetic field desired at a given range from the cable.

The typical electric circuit consisting of the generator, cables, electrodes, and sea water, can be energized, for example, continuously with d.c. and/or RMS a.c. currents of 800 to 1000 amperes and voltages between about 80 and 100 volts, and/or with impulses at rates from 1 to 35 pulses per second and time durations from 1 to 20 milliseconds. It is to be understood that the aforementioned values can be varied over a wide range, depending on the magnetic sensitivity, physiological and behavioral characteristics of the organisms to be controlled, and upon the configuration of the apparatus and the manner in which it is moved through the volume of water of interest.

Figure 1:
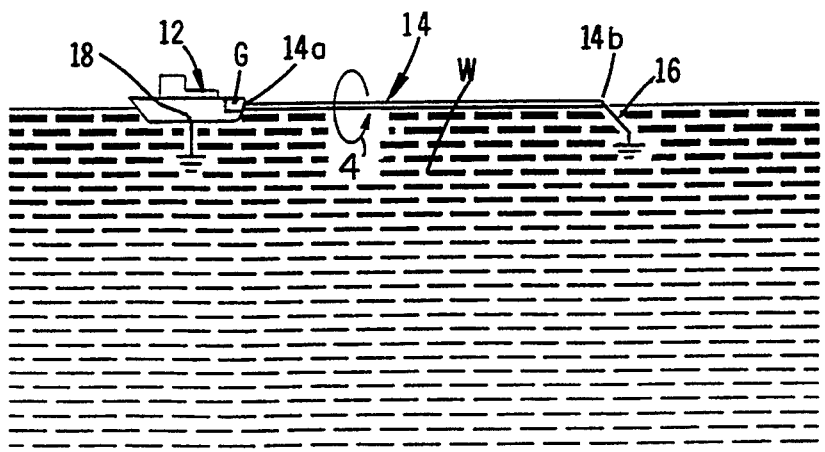
FIG. 1 is a generally diagrammatic view of one form of the apparatus of the invention.
Figure 4:
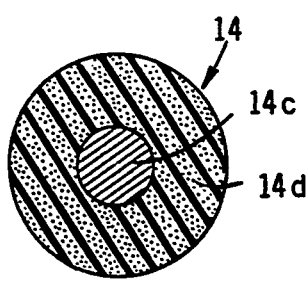
FIG. 4 is a cross-sectional view taken in the area "4" shown in FIGS. 1 and 2.

Referring to the drawings and particularly to FIGS. 1 and 4, one form of the apparatus of the present invention for influencing living organisms located within a defined volume is there illustrated. The apparatus of this form of the invention is used for influencing living organisms, such as fish, located within a defined volume of water "W" and which are sensitive to variations of the natural geomagnetic field. Such living organisms include tuna, salmon, dolphin, shark, shrimp, marlins and the like fish, all of which possess a magnetic dipole moment. (Sharks do not possess magnetic dipole moments, but have specialized sensors i.e., Lorenzini's ampullae, which respond to motion of the animal in the geomagnetic field).

In the forms of the invention shown in the drawings, the apparatus of the invention is towed through the water by a watercraft such as that indicated in FIG. 1 by the numeral 12.

The apparatus of FIG. 1 comprises magnetic field inducing means for inducing within the volume of water "W" an artificial vertical magnetic field which is of sufficient magnitude to overcome the sensitivity to the natural geomagnetic field of the organisms located within the water volume. The vertical magnetic field extends downwardly between the connecting point 14a of a cable 14 to the watercraft 12 and the terminal portion 14b of the cable. In order to controllably move the magnetic field inducing means through the water, moving means here depicted as a watercraft 12, is provided. While the moving means is here shown as a ship, it can also comprise other types of vessels and helicopters can also be used to move the magnetic field inducing means through the defined volume.

The magnetic field inducing means of the configuration of the apparatus shown in FIG. 1 comprises a single cable 14 which is towed along the surface of the volume of water by the watercraft 12. As best seen by also referring to FIG. 4, the cable 14 comprises an elongated electrical conductor 14c which is surrounded by a buoyant insulator 14d. Cable 14 includes a bare conductor end portion 16 which grounds the cable to the water, as indicated in FIG. 1. In use, conductor 14c is interconnected with any suitable generating means, such as a generator "G", for electrically energizing the conductor. Generator "G" can be carried by moving means and is of a character well known to those skilled in the art.

In the preferred form of the invention, the generator means is carried by the watercraft and is capable of reversing the direction of the current flow in the cable. More particularly, the current generating means is preferably adapted to controllably reverse the direction of current flow through the cable in a manner to concomitantly change the direction of the lines of force of the artificial magnetic field. As previously mentioned, the cable is terminally grounded so that the electric circuit is closed by the conductivity of the water between the free end 16 of the cable and the hull 18 of the towing vessel 12.

Of course, the intensity of the artificial magnetic field generated by the magnetic field inducing means must be strong enough to magnetically influence the patterns of movement of the organisms that are disposed within the water volume.

The flow of current in the horizontal conductor 14c, on the surface, will set up a magnetic field whose lines of force are vertical concentric rings around the cable 14. This field will have an upward direction on one side and a downward direction on the opposite side of the cable 14. Reversing the direction of the flow of current in the cable, will reverse the side where the field has an upward or downward direction and vice versa.

Figure 5:
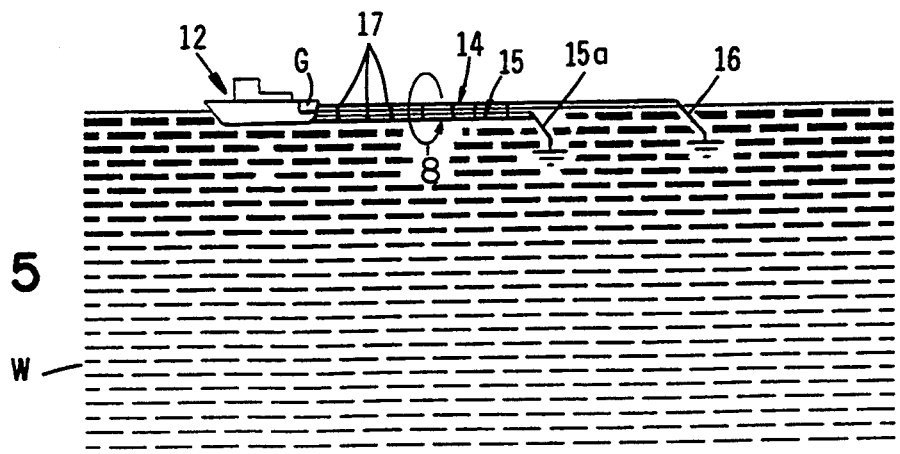
FIG. 5 is a generally diagrammatic view of a fourth form of the apparatus of the invention.

In the configuration of the apparatus shown in FIG. 5, which is similar to that shown in FIG. 1, a short buoyant cable 15, which terminates in a bare electrode 15a, is tied to the longer cable 14 by any suitable tie means such as twine, plastic and wire ties 17 which circumscribe cables 14 and 15. In this latest form of the apparatus, the effective vertical magnetic field is restricted to the area beneath the single section of the cable 14, which extends between the bare electrodes 15a and 16 of the short and long cables respectively. It is to be noted that in this configuration of the apparatus there is no need of the electrode 18 at the hull of the watercraft. By varying the length of the short cable 15 relative to the length of the long cable 14, the extent of the effective vertical magnetic field, can be restricted to well defined portions of the volume of water and can be shifted longitudinally along the long cable. It should be understood that, while the apparatus of FIG. 5 is shown for operation in series, in a manner well known in the art, it can be operated either in series or in parallel.

When operated in series, the electric circuit is closed through the body of water located between bare electrode 16 of the cable 14, and bare electrode 15a of cable 15. In the section wherein cables 14 and 15 are tied together, there will be no magnetic field established because the electric currents through the cables are flowing in opposite direction, so that the magnetic field established by the two cables will cancel one another. Accordingly, as previously mentioned, the effective vertical magnetic field established by the apparatus will always be restricted to the single section of cable 14, located between electrodes 15a and 16. When the apparatus of FIG. 5 is operated in parallel, the electric circuit 15 is closed through the water between the bare electrodes 15a and 16, in parallel, and it is necessary to provide a grounding electrode at the hull of the towing watercraft (not shown in FIG. 5).

Assuming, for example, that by construction, electric currents of the same intensity are passed through the long and short horizontal cables 14 and 15 of the cable assembly shown in FIG. 5. Then, in this case, the vertical magnetic field established in the volume of water around the double section of the cable assembly, (where the long and short cables are tied together), will have an intensity twice that of the vertical magnetic field established by the apparatus in the volume of water corresponding to the single section of cable 14. For a definite length of the horizontal long cable 14, a variation in the length of the short cable 15, will of course, change the extent of the vertical magnetic fields which are established by the apparatus. It is to be appreciated that by reversing the direction of the electric current flow through the cables 14 and 15, the vertical magnetic fields established by the apparatus in the portion of the volume of water around the cables can be made to change direction four times, that is twice for the operation of the apparatus in series and twice for the operation of the apparatus in parallel.

The previously identified current generating means, or generator "G", supplies relatively low voltage, high amperage d.c. and/or RMS a.c. currents, continuously and/or at impulses, and is connected to specific single cables and/or cable assemblies by command, control and regulation means well understood by those skilled in the art. The rate, duration and shape of the pulses depend on the physiological frequency and response time of the living organisms of interest. The pulse mode of operation may include "continuous" pulsing or/and "burst pulsing". The pulsing rate also determines the maximum penetration depth of the artificial magnetic field in sea water.

The generator G and related command, control and regulation means can be housed in the towing watercraft, or in a float located between the watercraft and the cables being towed. If desired, this intermediate float can also be self-propelled. In such case, command, control and regulation of the equipment housed in the float can be maintained, at a distance, from the watercraft, via radio, light signals or any other electronic means well understood by those skilled in the art.

Figure 2:
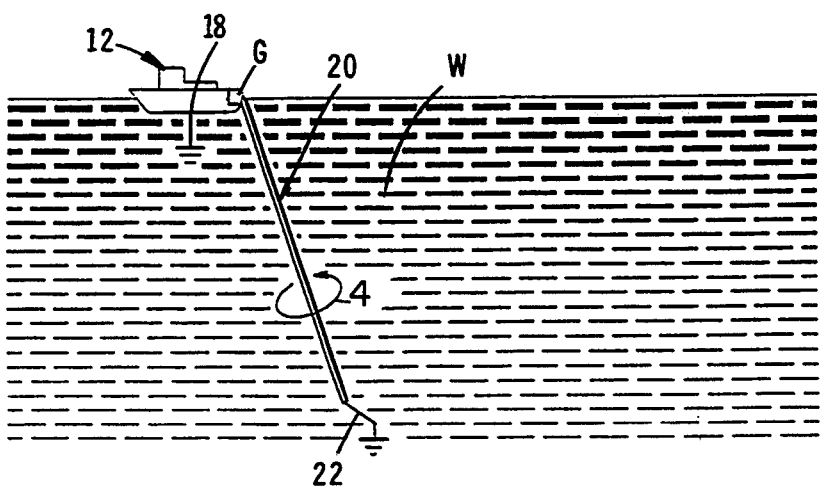
FIG. 2 is a generally diagrammatic view of a second form of the apparatus of the invention.
Figure 6:
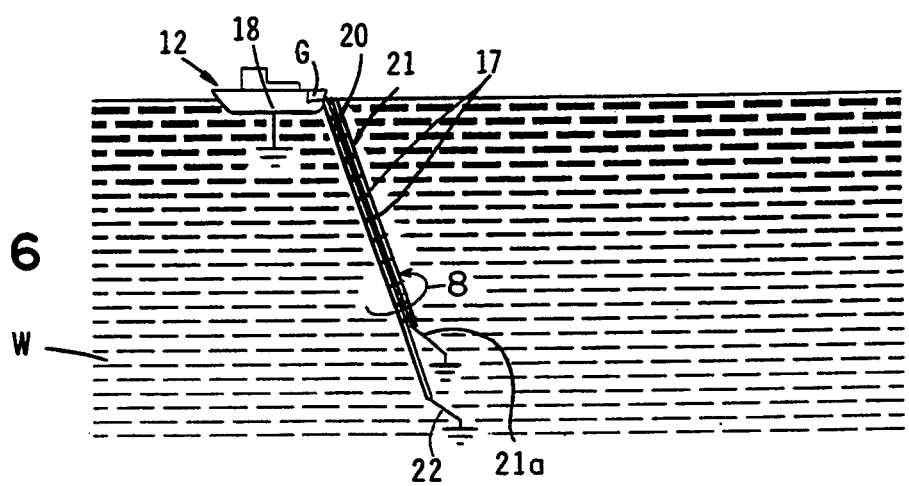
FIG. 6 is a generally diagrammatic view of a fifth form of the apparatus of the invention.

Turning now to FIGS. 2 and 6, two more configurations of the apparatus of the present invention are there illustrated. In the embodiment of the invention shown in FIG. 2, the magnetic field inducing means comprises a single long electrically energized insulated, non-buoyant, cable 20, which depends downwardly into the water "W" and is towed through the water by moving means such as watercraft 12. Once again, cable 20 comprises an elongated electrical conductor that is terminally grounded to sea water by means of a bare section 22.

As before, the electric circuit is closed by the conductivity of the water between the free end 22 of the cable and the electrode 18 at the hull of the watercraft. In using the configuration of the apparatus shown in FIG. 2, the cable 20 depends into the water volume "W" and slices through the water rather than passing along the surface.

The flow of current through the angularly, downwardly depending cable 20 will set up an artificial magnetic field whose lines of force comprise slanted horizontal concentric rings which circumscribe cable 20. The angularity of the cable 20 relative to the surface of the water, and, as a consequence, the degree of horizontality of the magnetic field set up in the water, depend on the speed of the towing craft. Hereinafter the angularly, downwardly depending single cable and cable assemblies will be simply referred to as a "vertical single cable" or as "vertical cable assemblies". The magnetic field established by these so-called "vertical" cables will, of course, have vertical and horizontal components.

The magnetic field set up by the vertical single cable 20 will have a clockwise or a counter-clockwise direction in the horizontal plane, depending on the direction of the current flow through the cable 20. By reversing the direction of the current flow in the cable 20, the direction of the lines of force around the cable 20 will be reversed from clockwise to counter-clockwise and vice versa.

In the configuration of the apparatus shown in FIG. 6, a short, non-buoyant cable 21, which terminates in bare electrode 21a, is tied to the long cable 20 by suitable tie means 17. In this form of the apparatus, the effective magnetic field will be restricted to the single section of cable 20 located between the bare electrodes 21a and 22 of the short and long cables, respectively, between which the electric circuit is closed through the water.

As before, by varying the length of the shorter cable 21, relative to the longer cable 20, the effective magnetic field can be restricted in depth to well defined portions of the volume of water surrounding the long cable 20. Once again, the apparatus illustrated in FIG. 6 can be operated, as desired, either in series or in parallel. (The particular connection shown in FIG. 6, is for the operation of the apparatus in series.)

In the apparatus of FIG. 6, the electric circuit is closed through the water between the bare electrode 22 of cable 20 and the bare electrode 21a of cable 21. There will be no magnetic field established around the double section where the cables 20 and 21 are tied together. This is because the electric currents through the cables 20 and 21 in the double section are flowing in opposite directions, causing the magnetic fields to cancel one another.

Where the apparatus of FIG. 6 is operated in parallel, the electric circuit would be closed through the water between the bare electrodes 21a and 22 in parallel and an electrode 18 connected to the hull of the towing watercraft.

Where electric currents of identical intensity are passed through the long and short cables of the apparatus, the magnetic field established in the portion of the volume of water proximate the location where cables 20 and 21 are tied together, will have an intensity twice that of the magnetic field established in the portion of the volume of water proximate the single section of the cable assembly. As before, by varying the length of the cable 21, the extent and depth of the magnetic fields established by the apparatus can be varied.

Similarly, by reversing the direction of the current flow through the cables, the direction of the magnetic fields can be made to change four times, that is, twice for the operation of the apparatus in series and twice for the operation of the apparatus in parallel.

Figure 3:
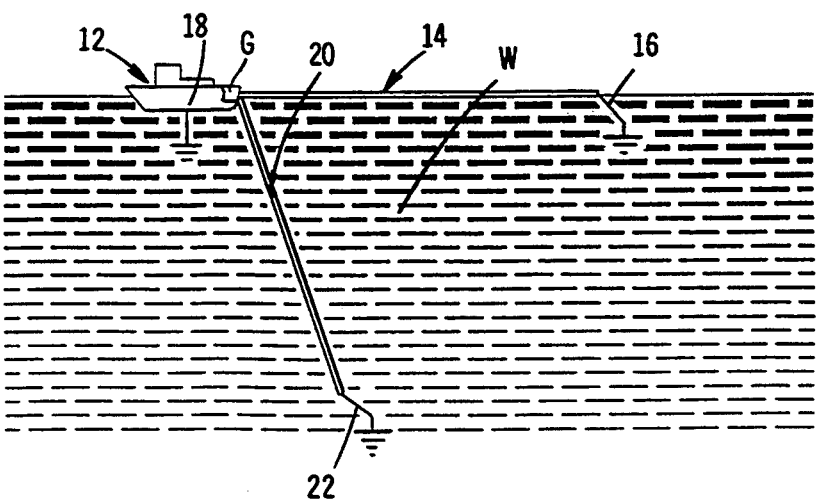
FIG. 3 is a generally diagrammatic view of a third form of the apparatus of the invention.
Figure 7:
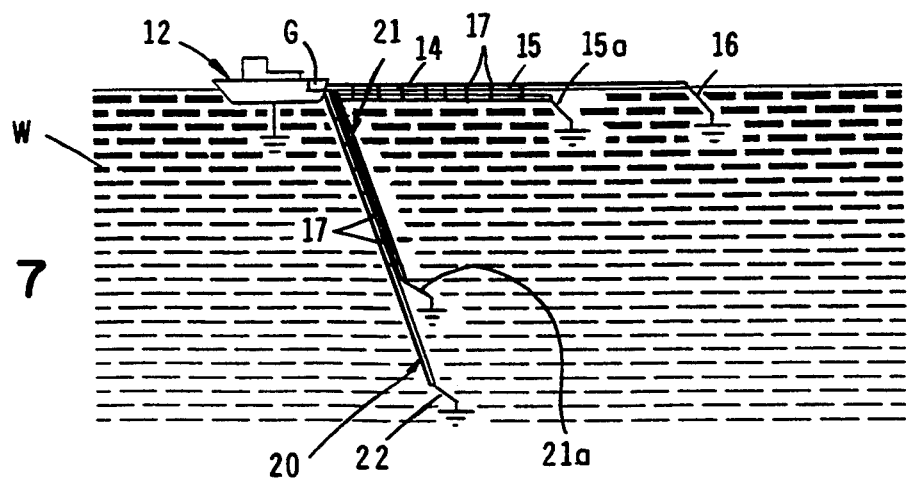
FIG. 7 is a generally diagrammatic view of a sixth form of the apparatus of the invention.
Figure 8:
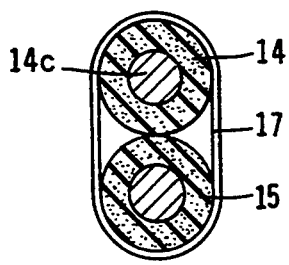
FIG. 8 is a cross-sectional view taken in the area "8" shown in FIGS. 5 and 6.

FIGS. 3 and 7 illustrate, in vertical view, two more embodiments of the apparatus of the present invention. The embodiment shown in FIG. 3 combines the configurations of the apparatus shown in FIG. 1 and in FIG. 2, which are of a character and operation previously described. The single cables and the cable assemblies shown in FIGS. 3 and in FIG. 7, respectively, can be used either independently of each other, or they can be connected in series or in parallel. As previously mentioned, the apparatus shown in FIG. 3 can use either the single horizontal cable 14 or the single vertical cable 20.

When the apparatus of FIG. 3 is operated in the above manner, the electric circuit is closed through the water, either between bare electrode 16, or between bare electrode 22 and an electrode 18 connected to the hull of the towing watercraft. Reversing the direction of the current flow through the single cables will reverse the direction of the lines of force of the vertical and downwardly depending, or "slanted" magnetic fields set up by the independently operated horizontal and vertical cables respectively.

When the apparatus of FIG. 3 is operated in series, simultaneous vertical and slanted horizontal magnetic fields will be set up. These component magnetic fields will combine vectorially to establish a resultant magnetic field that is angularly tilted with respect to the surface of the water (the reference direction) in the volume of water surrounding the long cable 14. At the same time, the apparatus shown in FIG. 3, will establish an independent, slanted horizontal magnetic field in the portion of the volume of water ahead of the horizontal cable 14 extending in depth for a distance equal to the length of the vertical cable 20. Reversing the direction of the current flow through the cables 14 and 20, will reverse the direction of the component vertical and slanted horizontal magnetic fields, and the resultant angularly tilted magnetic field in the portion of the volume of water surrounding the horizontal cable 14. This reversal of the direction of current flow will also change the direction of the independent, slanted horizontal magnetic field established in the portion of the volume of water ahead of the horizontal cable 14.

The configuration of the apparatus shown in FIG. 3 can also be connected in parallel. In this case the electric circuit would be closed through the water between the bare electrodes 16 and 22, in parallel, and an electrode 18 affixed to the hull of the towing watercraft. Again, in this case, simultaneous vertical and slanted horizontal magnetic fields will be set up by the apparatus in the portion of the volume of water surrounding the horizontal cable 14. The component magnetic fields will combine vectorially to produce a resultant magnetic field which is angularly tilted with respect to a reference direction.

In a parallel operation of the apparatus of FIG. 3, the resultant magnetic field established in the portion of the water located between cables 14 and 20 has a weaker intensity than the resultant magnetic field established in the corresponding portion of the water when the apparatus is operated in series. This is because, in the operation of the apparatus in series, electric current will flow in opposite directions in the cables 14 and 20 respectively, thus creating additive magnetic fields. When operating in parallel, the electric currents flowing through cables 14 and 20 are flowing in the same direction, thus creating magnetic fields that will oppose each other. The independent, slanted horizontal magnetic field established in the portion of the water ahead of cable 14, will have now a direction opposite to that of the slanted horizontal magnetic field established in the same portion of the water when the apparatus is operated in series. Reversing the direction of the flow of current through the cables 14 and 20, will reverse the directions of the magnetic fields established in the water surrounding the apparatus. As before, reversal of the direction of the current flow through the cables 14 and 20 will reverse the direction of the established magnetic fields four times, that is, twice for the operation in series and twice for the operation in parallel of the apparatus.

The apparatus shown in FIG. 7, which is shown as operating in parallel, combines the configurations of the apparatus illustrated in FIG. 5 and in FIG. 6, respectively. This apparatus can use either the horizontal cable assembly 14–15, or the vertical cable assembly 20–21 and, as was previously the case, the apparatus can be operated either in series or in parallel. When operated in parallel, simultaneous vertical and slanted horizontal magnetic fields will be induced within the volume of water surrounding the horizontal cable assembly 14–15. These component magnetic fields will combine vectorially to produce a resultant magnetic field which is angularly tilted with respect to a reference direction in the portion of volume of water surrounding the horizontal cable assembly 14–15. However, the component and resultant magnetic fields are spatially restricted to well defined portions of the volume of water surrounding the horizontal cable assembly 14–15.

More particularly, a weak, angularly tilted, resultant magnetic field will be established in the portion of the volume of water located between the double section of the cable assembly 14–15 and the double section of the cable assembly 20–21. This is because strong electric currents are flowing in the same direction through the double sections of cable assemblies 14–15 and 20–21, thus inducing component magnetic fields of opposing direction in the portion of the volume of water proximate the assemblies.

A still weaker angularly tilted resultant magnetic field will be induced in the portion of the volume of water located between the single sections of the cable assemblies 14–15 and 20–21, because of weaker electric currents flowing in the same direction in the single sections of the cable assemblies 14–15 and 20–21. By varying the lengths of the short cables 15 and 21, the spatial extent, both in length and in depth, of the within components of the magnetic fields can be varied.

In the configuration of the apparatus shown in FIG. 7, an independent slanted horizontal magnetic field is established in the portion of the volume of water ahead of the horizontal cable assembly 14–15. This independent slanted horizontal magnetic field, however, will present different intensities: a strong one, in correspondence of the double section of the cable assembly 20–21, and a weaker one in correspondence of the single section of the cable assembly 20–21. This is because, for parallel operation, the double section of the cable assembly 20–21 will carry greater currents than the single section of cable assembly 20–21.

In a series operation of the apparatus illustrated in FIG. 7, the electric circuit will be closed through the water between the bare electrodes 15a and 16 of the horizontal cable assembly and the bare electrodes 21a and 22 of the vertical cable assembly. Again, in this operational mode, vertical and slanted horizontal component magnetic fields will be established simultaneously in the volume of water surrounding the apparatus. These component vertical and slanted horizontal magnetic fields will combine vectorially to establish a resultant magnetic field in the volume of water surrounding the cable assembly 14–15. This resultant magnetic field is angularly tilted with respect to the surface of the water and is restricted to well-defined portions of the volume of water surrounding the horizontal cable assembly 14–15.

In the case of series operation of the apparatus, however, a strong angularly tilted resultant magnetic field will be established in the portion of the volume of water comprised between the double sections of the cable assemblies 14–15 and 20–21 thus creating additive magnetic fields. A weaker angularly tilted resultant magnetic field will be set up between the single sections of the cable assemblies 14–15 and 20–21 because of weaker currents there flowing. The independent, slanted horizontal magnetic field established in the portion of the volume of water ahead of the horizontal cable assembly 14–15 will be stronger in the depth corresponding to the double section of the cable assembly 20–21 than in the depth corresponding to the single section of the cable assembly 20–21. By varying the length of the short cable 21 relative to that of the long cable, the extent of the independent, slanted horizontal magnetic fields can be varied.

Reversing the direction of the current flow through the cable assemblies 14–15 and 20–21, will reverse the directions of the component and resultant magnetic fields established in the volume of water surrounding the apparatus. However, a single reversal of current in each of the configurations of the apparatus illustrated in FIG. 3 and in FIG. 7 will allow four changes in the direction of the established magnetic fields, that is, twice for the operation in series and twice for the operation in parallel.

Two more embodiments of the apparatus of the invention can be obtained by combining the configurations of the apparatus illustrated in FIG. 1 and in FIG. 6 and the configurations illustrated in FIG. 2 and in FIG. 5. In these embodiments, the apparatus can embody either the single long cable 14, or the vertical cable assembly 20–21, independently. The modes of operation of such an embodiment are of the character previously described in connection with the apparatus illustrated in FIG. 1 and in FIG. 6, respectively. As previously discussed such an embodiment can be operated either in series or in parallel.

In yet another embodiment of the apparatus of the invention, either the horizontal cable assembly 14–15 of FIG. 5 or the single vertical long cable 20 of FIG. 3, can be operated independently of each other. These modes of operation are of a character and operation previously described in connection with the apparatus shown in FIGS. 3 and 5 respectively. Such an apparatus can also be operated in series or in parallel in the manner previously described herein.

It is now apparent from the detailed description of the several basic configurations of the apparatus shown in FIGS. 1 through 8 and related above, that by controllably reversing the direction of the current flow through the cable, the apparatus can be employed in a large number of operational modes. More particularly, in the simple basic configurations of the apparatus illustrated in FIGS. 1 and 2, a reversal of the direction of the flow of current through the "single" cables 14 and 20 will produce four different operation modes, that is, two for the configuration of the apparatus of FIG. 1 and two for the configuration of the apparatus of FIG. 2. However, reversal of the direction of the current flow through the single cables, and cable assemblies of the composite configurations of the apparatus previously described herein will produce a total of 24 different modes of operation. This is because four changes of magnetic fields directions are associated with each of the composite basic configurations of the apparatus that is, twice for the operation of the apparatus in series and twice for the operation of the apparatus in parallel.

In other words, by simply reversing the direction of the current flow in the basic configurations of the apparatus herein described, a total of 28 different modes of operation are possible. Moreover, if "boards" or "otters" of the type used in trawl-fisheries are attached to the outboard ends of the single cables and cable assemblies, the outboard ends can be made to diverge, right and/or left, away from the center line of the towing watercraft. In this manner, three more operational modes (right-center-left) are possible for each of the 28 operational modes made possible by the reversal of the direction of the current flow. Thus, a total of 84 modes of operation are possible for the basic configurations of the apparatus as described herein.

It is also apparent that a specific configuration of the apparatus and a specific mode of operation can be found that match any specific fishing operation at hand, the only limitation being the ingenuity of the engineer and fisherman in putting the apparatus of the invention to actual use.

By appropriately controlling the electric current polarities of the currents flowing through the cables, a number of artificial magnetic fields can be established within the volume of water "W". More particularly, the apparatus of the invention shown in FIGS. 3 and 7 possess the unique capability of vectorially combining vertical and slanted horizontal magnetic fields to produce a resultant magnetic field whose vector is angularly inclined with respect to the surface of the water. In this manner, the apparatus can be uniquely configured and energized in a manner to magnetically influence and control tuna and related species, which in some oceanic areas of the world, but more frequently in the Eastern Tropical Pacific (ETP), migrate in association with certain types of dolphins.

As previously mentioned, the present method of harvesting dolphin-associated tuna is to encircle the schools of dolphin with a large seine net. Some tuna species typically migrate with dolphin schools; the dolphins, being mammals, swimming in the top layers of the water, and the tuna swimming beneath the dolphins.

When the net is set, the tuna along with the dolphins, will be captured. This typically results in the needless death of thousands of dolphins each year by drowning.

By using the apparatus of the present invention to generate specifically configured artificial magnetic fields of the character previously described, tuna and dolphins can be separated, each school directed in different directions, and the net solely set on tuna. In this way dolphin mortality can be totally eliminated and the harvesting of tuna substantially increased.

It is to be understood that in using the apparatus of the present invention, single or multiple cable assemblies can be towed by, or controlled at a distance from, one or more fishing vessels operating independently or in groups. However, since fish are usually frightened by stimuli as noise, the cable assemblies can also be efficiently towed by, or controlled at a distance from, one or more helicopters operating independently or in groups.

In the case of the control at a distance from either watercraft or helicopters, the apparatus can be attached to an appropriate float which can also house the generator and control systems. The float, if constructed of metal, will close the electric circuit in water or, if constructed of non-conducting material, will be furnished with an appropriate length of bare electric grounding cable for closing the electric circuit in water.

While the apparatus of the invention is depicted in the drawings as being applied to a volume of water, the method of the invention can be used for influencing living organisms located within any defined volume so long as the living organisms possess natural magnetic dipole moments.

Stated another way, so long as the living organisms have an innate sensitivity to variations of the natural geomagnetic field, the method of the invention can be used to influence such organisms in a number of ways. For example, artificial magnetic fields of first magnitude and direction can be created in a first portion of a defined volume while artificial magnetic fields of a second magnitude and direction can be created in a second portion of the defined volume. In this way, behavior and movement of the organisms within the volume can be controlled.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A method for influencing fish, including tuna and dolphin located within a volume of water which are sensitive to variations in the natural geomagnetic field by creating within said volume of water:
   (a) a first artificial magnetic field of a first magnitude and vertical plane which is restricted to a first portion of the volume of water to influence and control dolphin and tuna;
   (b) a second artificial magnetic field of a second magnitude and generally horizontal plane which is restricted to a second portion of the volume of water to influence and control only dolphins; and
   (c) a third artificial magnetic field of a third magnitude which is the vectorial resultant of said first and second magnetic field.

2. An apparatus for influencing living organisms located within a defined volume which organisms are sensitive to variations in the natural geomagnetic field, said apparatus comprising magnetic field inducing means for inducing within the defined volume artificial magnetic fields of desired magnitude and direction, said magnetic field inducing means comprising:
   (a) a first horizontally extending conductor;
   (b) a second vertical downwardly depending electrical conductor;

(c) means for inducing the flow of electric current through said first and second conductors in a first or second direction; and (d) a third horizontally extending electric conductor interconnected with said first horizontally extending electrical conductor, said third conductor being shorter than said first conductor.

3. An apparatus for influencing living organisms located within a defined volume which organisms are sensitive to variations in the natural geomagnetic field, said apparatus comprising magnetic field inducing means for inducing within the defined volume artificial magnetic fields of desired magnitude and direction, said magnetic field inducing means comprising:

(a) a first horizontally extending conductor;

(b) a second vertical downwardly depending electrical conductor;

(c) means for inducing the flow of electric current through said first and second conductors in a first or second direction; and (d) a third downwardly depending electrical conductor interconnected with said second downwardly depending electrical conductor, said third conductor being shorter than said second conductor.

4. An apparatus as defined in claim 3 further including a fourth horizontally extending electrical conductor interconnected with said first horizontally extending electrical conductor, said fourth conductor being shorter than said first conductor.

5. An apparatus as defined in claim 4 in which said first and third conductors are connected in series and in which said second and fourth conductors are connected in series.

6. A method for influencing fish, including first and second species of fish, within a volume of water which are sensitive to variations in the natural geomagnetic field by creating within said volume of water:

(a) a first artificial magnetic field of a first magnitude and vertical plane which is restricted to a first portion of the volume of water to influence and control the first and second species of fish;

(b) a second artificial magnetic field of a second magnitude and generally horizontal plane which is restricted to a second portion of the volume of water to influence and control the second species of fish; and (c) a third artificial magnetic field of a third magnitude and generally horizontal plane which is restricted to a third portion of the volume of water to influence and control the second species of fish.

7. A method as defined in claim 6 further including creating within said volume of water a fourth and a fifth artificial magnetic field of a fourth and fifth magnitude which are the vectorial resultant of said first and second magnetic fields, and of the said first and third magnetic fields, respectively.

8. A method for influencing fish, including tuna and dolphin located within a volume of water which are sensitive to variations in the natural geomagnetic field by creating within said volume of water:

(a) a first artificial magnetic field of a first magnitude and vertical plane which is restricted to a first portion of the volume of water to influence and control dolphin and tuna;

(b) a second artificial magnetic field of a second magnitude and generally horizontal plane which is restricted to a second portion of the volume of water to influence and control only dolphins;

(c) a third artificial magnetic field of a third magnitude and generally horizontal plane which is restricted to a third portion of the volume of water to influence and control only tuna;

(d) a fourth artificial magnetic field of a fourth magnitude which is the vectorial resultant of said first and second magnetic fields; and (e) a fifth artificial magnetic field of a fifth magnitude which is the vectorial sum of the first and third magnetic fields 9. An apparatus for influencing fish located within a volume of water having a surface in which the fish are sensitive to variations in the natural geomagnetic field, said apparatus comprising means for creating a first artificial magnetic field which is restricted to a first portion of the volume of water to influence and control fish within said first portion, said means comprising:

(a) a first conductor of a first length passing through the volume of water and extending angularly downwardly relative to the surface;

(b) a second conductor connected to said first conductor, said second conductor being of a second length less than said first length and passing through the volume of water, said second conductor extending angularly downwardly relative to the surface;

(c) means for inducing the flow of electric current through said first and second conductors in a first or second direction.

10. An apparatus as defined in claim 9 further including:

(a) a third conductor of a first length passing through the volume of water;

(b) a fourth conductor connected to said third conductor, said fourth conductor being of a second length less than said first length and passing through the volume of water; and (c) means for inducing the flow of electric current through said third and fourth conductors in a first or second direction.

11. An apparatus as defined in claim 10 in which said first and second conductors extend generally parallel to the surface and in which said third and fourth conductors depend angularly downwardly relative to the surface.

* * * * *